(No Model.) 2 Sheets—Sheet 1.

W. E. WALKER, G. E. WILBUR & B. W. FELTON.
FURNACE DAMPER.

No. 344,509. Patented June 29, 1886.

WITNESSES
J. M. Dolan
Fred. B. Dolan.

INVENTOR
Benj. W. Felton
William E. Walker
George E. Wilbur
by their attys
Clarke & Raymond (No Model.) 2 Sheets—Sheet 2.

W. E. WALKER, G. E. WILBUR & B. W. FELTON.
FURNACE DAMPER.

No. 344,509. Patented June 29, 1886.

WITNESSES.
J. M. Dolan.
Fred. B. Dolan.

INVENTOR.
Benj. W. Felton,
William E. Walker,
Geo. E. Wilbur,
by his attys
Clarke & Raymond

UNITED STATES PATENT OFFICE.

WILLIAM E. WALKER AND GEORGE E. WILBUR, OF TAUNTON, AND BENJAMIN W. FELTON, OF BOSTON, MASS.; SAID WALKER AND WILBUR ASSIGNORS OF ONE-FOURTH OF THEIR RIGHT TO SAID FELTON.

FURNACE-DAMPER.

SPECIFICATION forming part of Letters Patent No. 344,509, dated June 29, 1886.

Application filed January 29, 1885. Serial No. 154,374. (No model.)

*To all whom it may concern:*

Be it known that we, WILLIAM E. WALKER and GEORGE E. WILBUR, both of Taunton, in the county of Bristol, and BENJAMIN W. FELTON, of Boston, in the county of Suffolk, all in the State of Massachusetts, citizens of the United States, have invented a new and useful Improvement in Furnace-Dampers, of which the following is a full, clear, and exact description, reference being had to the accompanying drawings, forming a part of this specification, in explaining its nature, in which—

Figure 1:
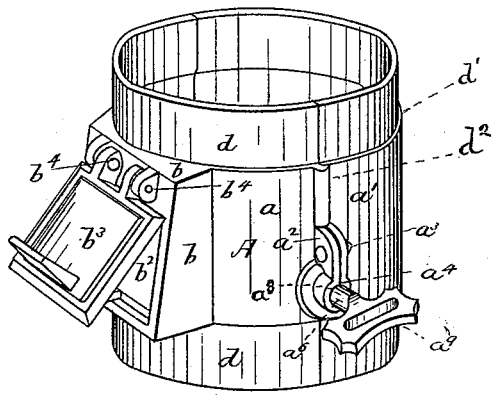
Figures 2, 3:
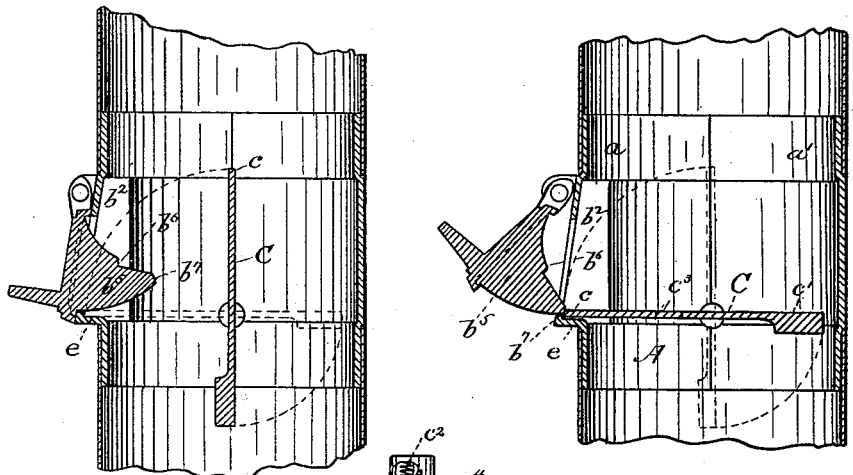
Figure 4:
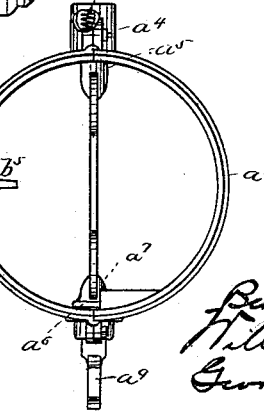
Figure 5:
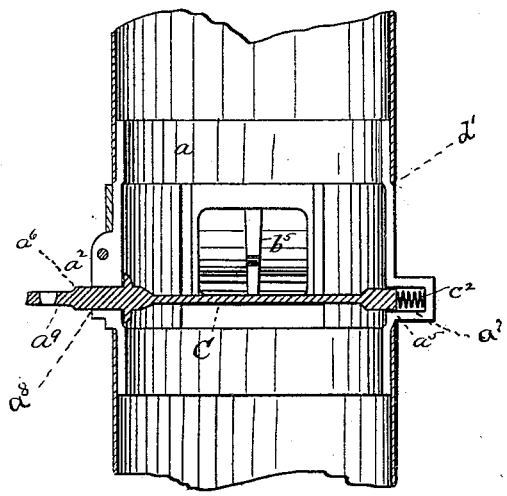
Figure 6:
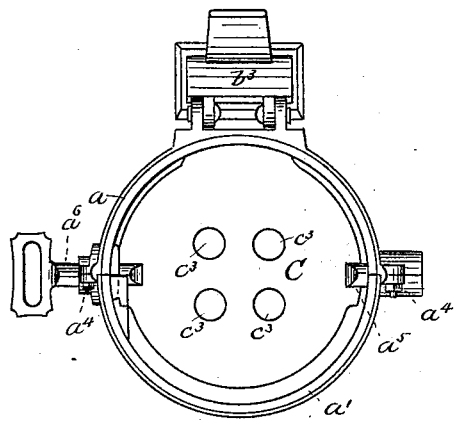

Figure 1 is a perspective view of a damper having the features of our invention. Fig. 2 is a vertical central section showing the position of parts when the damper is wide open. Fig. 3 is also a view in vertical section, showing the position of parts when the damper is closed. Fig. 4 is a plan view with damper wide open. Fig. 5 is a view in central section at right angles to that shown in Fig. 2. Fig. 6 is a plan view showing the damper closed, the cold-air inlet open, and the position which the main damper bears to the cold-inlet door or valve while in such position.

Our invention relates to a damper especially adapted for furnaces having a cold-air check door or valve adapted to be automatically opened and closed upon the movement of the main damper.

In the drawings, A represents the damper casing or box. It preferably is cylindrical in shape and cast in two parts, $a$ $a'$, each of which has the lugs or projections $a^2$, which furnish supports for the fastening bolts or screws $a^3$, and bearings $a^4$ for the trunnion or pivot $a^5$ and spindle $a^6$ of the damper.

C is the main damper. It has the pivot or trunnion $a^5$ at one end, which extends into the bearing-hole $a^7$, between the two lugs $a^2$, and the spindle $a^6$, which extends through the hole $a^8$, formed in the lugs $a^2$, and has at its end the handle $a^9$. The damper is of ordinary shape, with the exception that it is provided with the extension $c$, which is adapted to enter, upon the closing movement of the damper, into the space or passage $b^2$. This space or passage is formed in the damper box or casing by an extension outward from the surface or shell of the casing of the walls or box $b$, (see Fig. 1,) and the opening thereto is closed by a door or valve, $b^3$, which is hinged at $b^4$.

The edge or surface against which the door closes when the box is for a vertical position is inclined, as represented in Fig. 1, so that when the damper-box is vertical the door or valve will close automatically. The valve is also provided with an inwardly-projecting tongue, $b^5$, (see Figs. 2 and 3,) which preferably has a notch, $b^6$, and the square end $b^7$. This tongue is so arranged in relation to the main damper-extension $c$ that in turning the damper it comes in contact with the edge of the tongue and rides down it and pushes the door out, thereby opening the cold-air passage $b^2$. The notch or shoulder $b^6$ and the end $b^7$ of the tongue shut upon the edge of the projection $c$, and serve to hold or lock the door or valve, either partly open or entirely open, as the case may be.

To balance the damper, we have arranged opposite the projection $c$ the counterbalancing-weight $c'$, cast on the damper, and there may be used additionally, for the purpose of exerting more friction upon the damper and holding it in any desired position, the spring $c^2$, which bears against the end of the pivot or trunnion $a^5$. The damper casing or box has the sections $d$ outside or beyond the shoulders $d'$, for holding pipe ends; and the damper also, preferably, is provided with perforations $c^3$, to permit the passage of gas from the furnace when the damper is shut or almost shut. One section of the casing may also have ears $d^2$, which extend upon the other, for preventing the lateral movement of one in relation to the other.

In operation, upon the movement of the main damper to a position which very nearly closes the direct draft, the extension $c$ comes in contact with the tongue and moves the door or valve $b^3$ outward, opening the cold-air passage $b^2$ until it rides onto the shoulder $b^6$, which rests upon the edge of the extension. If the damper is left in this position, then the door or valve to the cold-air passage is partly open. If it is desired, however, to still further control the draft, the main damper is still further moved, and the extension moves upon the tongue until it reaches the stop $e$, which is the lower side of the cold-air passage, when the end of the tongue will shut against the edge of the extension. Upon the opening of the main damper the cold-air door or valve automatically closes.

While we have described this damper as a furnace-damper, we would not be understood as limiting ourselves to its use in a furnace, but may employ it in stoves, ranges, or in any other connection where it is desirable to close one passage and at the same time to automatically open another.

The advantages of this invention arise from the cheapness and simplicity of the construction and effectiveness of its operation.

Having thus fully described our invention, we claim and desire to secure by Letters Patent of the United States—

1. The combination of the casing A, the main damper C, having the extension $c$, the cold-air inlet $b^2$, the door $b^3$, having the tongue $b^5$, all adapted to operate substantially as and for the purposes described.

2. The damper box or casing comprising the section $a$, having the shoulders $d'$ and sections of the pipe-collars $d$, the damper C and the box or casing $b$, projecting laterally therefrom, having the cold-air opening or passage $b^2$, and the valve $b^3$, and the section $a'$, also having shoulders $d'$ and sections of pipe-collars $d$, the lugs $a^2$ and screws $a^3$, and damper-bearings arranged between the two sections, as specified, all substantially as and for the purposes described.

WILLIAM E. WALKER.
GEO. E. WILBUR.
BENJAMIN W. FELTON.

Witnesses to William E. Walker and George E. Wilbur:
   H. T. MONTGOMERY,
   ELISHA T. JACKSON.

Witnesses to B. W. Felton:
   F. F. RAYMOND,
   FRED. B. DOLAN.